(12) United States Patent
Wu

(10) Patent No.: US 10,079,893 B2
(45) Date of Patent: Sep. 18, 2018

(54) M2M APPLICATION REQUEST SENDING METHOD, CSE AND SYSTEM

(71) Applicant: ZTE Corporation, Shenzhen, Guangdong (CN)

(72) Inventor: Hao Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 184 days.

(21) Appl. No.: 15/031,911

(22) PCT Filed: May 4, 2014

(86) PCT No.: PCT/CN2014/076742
§ 371 (c)(1),
(2) Date: Apr. 25, 2016

(87) PCT Pub. No.: WO2014/180286
PCT Pub. Date: Nov. 13, 2014

(65) Prior Publication Data
US 2016/0269490 A1    Sep. 15, 2016

(30) Foreign Application Priority Data
Oct. 29, 2013 (CN) .......................... 2013 1 0522731

(51) Int. Cl.
*H04L 29/08* (2006.01)
*H04W 4/20* (2018.01)
(Continued)

(52) U.S. Cl.
CPC ............. *H04L 67/141* (2013.01); *H04W 4/20* (2013.01); *H04W 4/70* (2018.02); *H04W 24/04* (2013.01)

(58) Field of Classification Search
CPC ... H04L 67/14; H04L 67/141; H04L 67/2809; H04W 4/005; H04W 4/20; H04W 24/04; H04W 88/16
(Continued)

(56) References Cited

U.S. PATENT DOCUMENTS 8,554,216 B2    10/2013   Roenneke
8,675,489 B2    3/2014    Roenneke
(Continued)

FOREIGN PATENT DOCUMENTS

CN    101932068 A    12/2010
CN    102158911 A    8/2011
(Continued)

OTHER PUBLICATIONS

ZTE (Rapporteur) et al, "oneM2M Functional Architecture", Oct. 2013, OneM2MPartners, oneM2M-TS-0001 one M2M Function Architecture -V-0.2.1, pp. 1-107 (Year: 2013).*
(Continued)

*Primary Examiner* — Ruolei Zong
(74) *Attorney, Agent, or Firm* — Cooper Legal Group, LLC

(57) ABSTRACT

A method, system and a Common Service Entity (CSE) for sending a Machine-to-Machine (M2M) application request are provided. The method includes that: after receiving a request sent by an M2M application, a local CSE sends the request of the M2M application to a target CSE according to a value of a request type or according to a value of delay time for request sending and a value of a request type in the request, wherein the request sent by the M2M application includes one or more of the following parameters: an application identifier, the delay time for request sending and the request type.

13 Claims, 2 Drawing Sheets

(51) Int. Cl.
*H04W 24/04* (2009.01)
*H04W 4/00* (2018.01)
*H04W 4/70* (2018.01)

(58) Field of Classification Search
USPC ........................................................ 709/220
See application file for complete search history.

(56) References Cited

U.S. PATENT DOCUMENTS

| | | |
|---|---|---|
| 2011/0268026 A1 | 11/2011 | Roenneke |
| 2011/0269473 A1 | 11/2011 | Roenneke |
| 2012/0307764 A1 | 12/2012 | Zhao |
| 2013/0013555 A1* | 1/2013 | Foti ................... H04W 4/08 707/609 |
| 2013/0040678 A1 | 2/2013 | Lee |
| 2014/0359131 A1* | 12/2014 | Seed ............... H04L 47/125 709/226 |
| 2015/0033312 A1* | 1/2015 | Seed ................. H04L 67/14 726/7 |
| 2015/0245205 A1* | 8/2015 | Kim ................. H04W 72/10 726/4 |
| 2016/0234656 A1* | 8/2016 | Iwai .................. H04W 4/06 |

FOREIGN PATENT DOCUMENTS

| | | |
|---|---|---|
| CN | 102244856 A | 11/2011 |
| CN | 102860111 A | 1/2013 |
| EP | 2445165 A1 | 4/2012 |

OTHER PUBLICATIONS

International Search Report in international application No. PCT/CN2014/076742, dated Aug. 12, 2014, 2 pgs.

English Translation of the Written Opinion of the International Search Authority in international application No. PCT/CN2014/076742, dated Aug. 12, 2014, 9 pgs.

Qualcomm Inc (TIA) et al: "Delivery Handling in CSE",0NEM2M-ARC-2013-0285-Delivery Handling in CSE. DOC, 0NEM2M~vol. WG2—Architecture, ARC Jun. 9, 2013 (Jun. 9, 2013), pp. 1-16, XPO84O02327,Retrieved from the Internet:URL:URL =http://member.onem2ni.org/Appl i cation/docum enta/down oadimmediate/default.aspx?docl D:2060 [retrieved on Jun. 9, 2013],mailed on Jun. 9, 2013.

Supplementary European Search Report in European application No. 14794220.5, dated Sep. 22, 2016, 9 pgs.

* cited by examiner

M2M APPLICATION REQUEST SENDING METHOD, CSE AND SYSTEM

TECHNICAL FIELD

The disclosure relates to the technical field of mobile communications, and in particular to a method, a Common Service Entity (CSE) and a system for sending a Machine-to-Machine (M2M) application request.

BACKGROUND

An M2M communication network consists of various M2M nodes and bearer networks. The M2M nodes implement communication through the bearer networks, and each M2M node at least includes an application or a CSE.

The M2M nodes may be divided into three categories according to different functions: application nodes, intermediate nodes and basic nodes, as shown in FIG. 1, wherein each application node is required to include at least one M2M application, and does not include any CSE;

each intermediate node is required to include at least one CSE, and may include at least one M2M application; and each basic node is required to include at least one CSE and at least one M2M application.

Communication among the M2M applications is implemented by interaction among the CSEs, the M2M applications are connected to the CSEs through X interfaces, and the CSEs communicate through Y interfaces, as shown in FIG. 1. In a practical application process, a local CSE sends a request message sent by an M2M application to a target CSE through the bearer network, but the request message may be invalidated immediately, thereby causing a sending failure and having influence on implementation of the M2M application when the bearer network fails or is disconnected. Moreover, after the bearer network is recovered, the M2M application is required to resend the request message to the local CSE, so that network signalling is correspondingly increased, and a network resource is consumed.

SUMMARY

In view of this, a main purpose of the embodiments of the disclosure is to provide method, CSE and system for sending a request of an M2M application, which may ensure that a request sent by an M2M application before a bearer network fails or is disconnected is kept valid until the fault or disconnected bearer network is recovered.

In order to achieve the purpose, the technical solutions of the embodiments of the disclosure are implemented as follows.

An embodiment of the disclosure provides a method for sending a request of the M2M application, which may include that:

after receiving a request sent by an M2M application, a local CSE sends the request of the M2M application to a target CSE according to a value of a request type in the request or according to a value of delay time for request sending and a value of a request type in the request, wherein the request sent by the M2M application may include one or more of following parameters: an application identifier, the delay time for request sending and the request type.

Preferably, the step that the local CSE sends the request of the M2M application to the target CSE according to the value of the request type in the request may include that:

the local CSE searches a locally stored request type configuration table for a bearer network corresponding to the request type according to the value of the request type in the request, and sends the request of the M2M application to the target CSE through the bearer network when detecting that the bearer network has been connected to the target CSE.

Preferably, the step that the local CSE sends the request of the M2M application to the target CSE according to the value of the delay time for request sending and the value of the request type in the request may be implemented as follows:

the local CSE searches a locally stored request type configuration table for a bearer network corresponding to the request type according to the value of the request type in the request, reads the value of the delay time for request sending in the request when detecting that the bearer network is not connected to the target CSE, tries to connect the bearer network according to the value of the delay time for request sending, and sends the request of the M2M application to the target CSE after successful connection.

Preferably, when the value of the delay time for request sending is 0, the step that the local CSE tries to connect the bearer network according to the value of the delay time for request sending and sends the request of the M2M application to the target CSE after successful connection may include that:

the local CSE immediately establishes a connection with the target CSE according to the bearer network corresponding to the request type of the request of the M2M application, and sends the request of the M2M application to the target CSE after the connection is successfully established.

Preferably, when the value of the delay time for request sending is not 0, the step that the local CSE tries to connect the bearer network according to the value of the delay time for request sending and sends the request of the M2M application to the target CSE after successful connection may include that:

the local CSE starts a timer, a value of fixed time being not greater than the value of the delay time for request sending, and the local CSE stores the request of the M2M application before the fixed time is reached, tries to establish the connection with the target CSE when the timer expires, and sends the request of the M2M application to the target CSE after the connection is successfully established.

Preferably, the method may further include that:

if there is still a request of an M2M application sent to the same target CSE before the fixed time of the timer is reached, the local CSE combines all the requests of the M2M applications sent to the same target CSE, establishes the connection with the target CSE when the timer expires, and sends the combined requests to the target CSE after the connection is successfully established.

An embodiment of the disclosure further provides a CSE, which may include: a receiving module and a sending module, wherein the receiving module may be configured to receive a request sent by an M2M application; and the sending module may be configured to send the request of the M2M application to a target CSE according to a value of a request type in the request or according to a value of delay time for request sending and a value of a request type in the request, wherein the request sent by the M2M application may include one or more of following parameters: an application identifier, the delay time for request sending and the request type.

Preferably, the sending module may be configured to search a locally stored request type configuration table for a bearer network corresponding to the request type according to the value of the request type in the request, and send the request of the M2M application to the target CSE through the bearer network when detecting that the bearer network has been connected to the target CSE.

Preferably, the sending module may be configured to search a locally stored request type configuration table for a bearer network corresponding to the request type according to the value of the request type in the request, read the value of the delay time for request sending in the request when detecting that the bearer network is not connected to the target CSE, try to connect the bearer network according to the value of the delay time for request sending, and send the request of the M2M application to the target CSE after successful connection.

Preferably, the sending module may be configured to, when the value of the delay time for request sending is 0, immediately establish a connection with the target CSE according to the bearer network corresponding to the request type of the request of the M2M application, and send the request of the M2M application to the target CSE after the connection is successfully established.

Preferably, the sending module may be configured to, when the value of the delay time for request sending is not 0, start a timer in the CSE, a value of fixed time being not greater than the value of the delay time for request sending, and store the request of the M2M application before the fixed time is reached, try to establish the connection with the target CSE when the timer expires, and send the request of the M2M application to the target CSE after the connection is successfully established.

Preferably, the sending module may further be configured to determine whether there is still a request of an M2M application sent to the same target CSE or not before the fixed time of the timer is reached, combine all the requests of the M2M applications sent to the same target CSE if there is still a request of an M2M application sent to the same target CSE, establish the connection with the target CSE when the timer expires, and send the combined requests to the target CSE after the connection is successfully established.

An embodiment of the disclosure further provides system for sending a request of the M2M application, which may include: an M2M application, a local CSE and a target CSE, wherein the local CSE is the abovementioned CSE.

According to the method, CSE and system for sending a request of the M2M application provided by the embodiments of the disclosure, a local CSE sends a request of the M2M application to a target CSE according to the value of a request type in a request or according to the value of delay time for request sending and the value of a request type in the request after receiving the request sent by the M2M application, wherein the request sent by the M2M application includes one or more of the following parameters: an application identifier, the delay time for request sending, and the request type. According to the embodiments of the disclosure, when the bearer network fails or is disconnected, the request sent by the M2M application may not be invalidated immediately, but can be reserved for a certain period of time on the local CSE, and when the bearer network is recovered or reconnected, the local CSE may send the request to the target CSE. In addition, in the embodiments of the disclosure, the requests sent to the same target CSE are combined, and are simultaneously sent to the target CSE when the timer expires, so that both network signalling and network resource consumption may be reduced.

DETAILED DESCRIPTION

In the embodiments of the disclosure, after receiving a request sent by an M2M application, a local CSE sends the request of the M2M application to a target CSE according to a value of a request type in the request or according to a value of delay time for request sending and a value of a request type in the request, wherein the request sent by the M2M application includes one or more of the following parameters: an application identifier, the delay time for request sending and the request type.

Here, the application identifier, which is used to identify an application from which the request is sent, has no influence on the technical solutions of the embodiments of the disclosure, and serves as a conventional parameter only and is used by a CSE to make data statistics, for example, to find applications from which more requests are received, and accordingly to perform modification, formulation and the like on some strategies.

The disclosure will be further described below with reference to the drawings and specific embodiments in detail.

Embodiment 1

Figure 1:
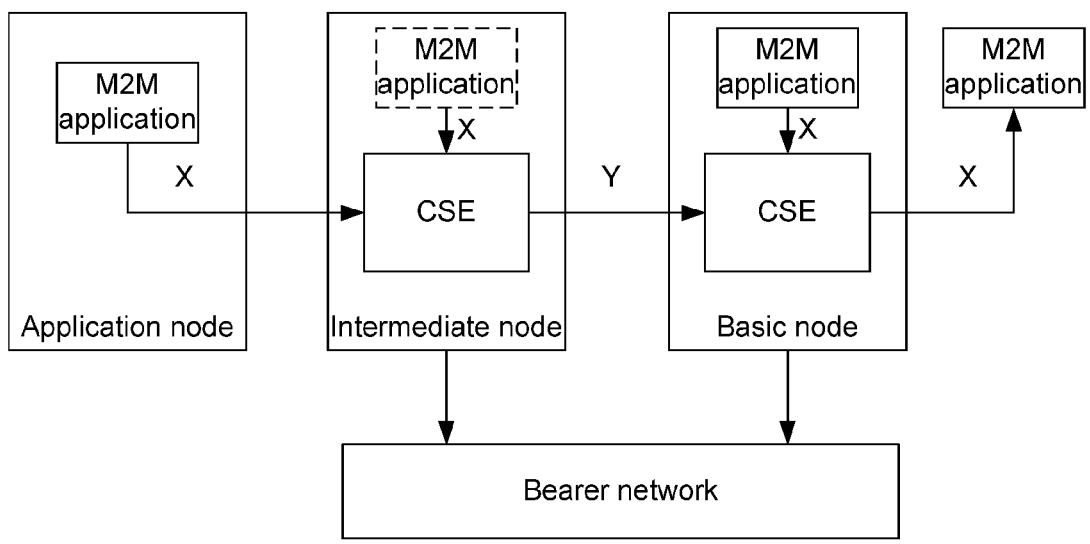
FIG. 1 is a diagram of a network architecture of an M2M communication system.
Figure 2:
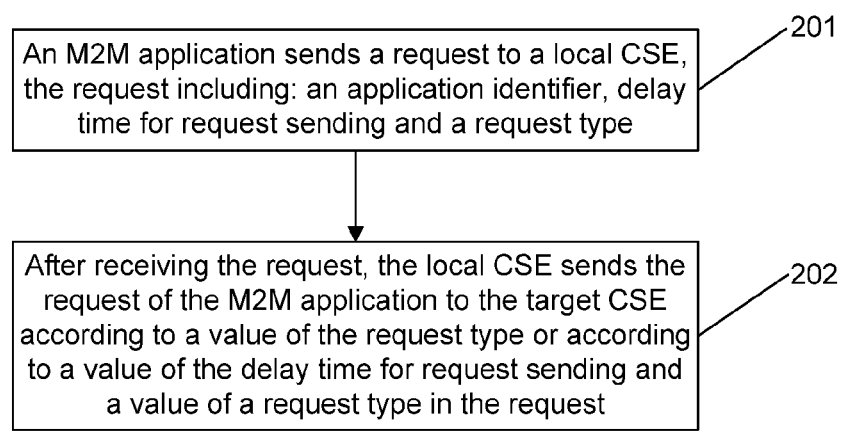
FIG. 2 is an implementation flowchart of a method for sending an M2M request according to embodiment 1 of the disclosure.

As shown in FIG. 2, an implementation flow of a method for sending an M2M request according to the embodiment includes the following steps:

step 201: an M2M application sends a request to a local CSE to request the local CSE to send the request of the M2M application to a target CSE, the request including: an application identifier, delay time for request sending and a request type; and step 202: after receiving the request, the local CSE sends the request of the M2M application to the target CSE according to a value of the request type in the request or according to a value of the delay time for request sending and a value of a request type in the request.

Here, the step that the local CSE sends the request of the M2M application to the target CSE according to the value of the request type in the request is implemented as follows:

the local CSE searches a locally stored request type configuration table for a proper bearer network corresponding to the request type according to the value of the request type in the request, and sends the request of the M2M application to the target CSE through the proper bearer network when detecting that the proper bearer network has been connected to the target CSE.

Here, the step that the local CSE sends the request of the M2M application to the target CSE according to the value of the delay time for request sending and the value of the request type in the request is implemented as follows:

the local CSE searches a locally stored request type configuration table for a proper bearer network corresponding to the request type according to the value of the request type in the request, reads a value of the delay time for request sending in the request when detecting that the proper bearer network is not connected to the target CSE, tries to connect the bearer network according to the value of the delay time for request sending, and sends the request of the M2M application to the target CSE after successful connection.

Here, when the value of the delay time for request sending is 0, the step that the local CSE tries to connect the bearer network according to the value of the delay time for request sending and sends the request of the M2M application to the target CSE after successful connection includes that:

the local CSE immediately establishes a connection with the target CSE according to the bearer network corresponding to the request type of the request of the M2M application, and sends the request of the M2M application to the target CSE after the connection is successfully established.

Here, when the value of the delay time for request sending is not 0, the step that the local CSE tries to connect the bearer network according to the value of the delay time for request sending and sends the request of the M2M application to the target CSE after successful connection includes that:

the local CSE starts a timer, a value of fixed time being not greater than the value of the delay time for request sending, and the local CSE stores the request of the M2M application before the fixed time is reached, tries to establish the connection with the target CSE when the timer expires, and sends the request of the M2M application to the target CSE after the connection is successfully established.

From the above, in the embodiment of the disclosure, when the bearer network fails or is disconnected, the request sent by the M2M application may not be invalidated immediately, but may still be reserved for a certain period of time on the local CSE, and when the bearer network is recovered or reconnected, the local CSE may send the request to the target CSE.

Preferably, the method further includes that: if there is still a request of an M2M application sent to the same target CSE before the fixed time of the timer is reached, the local CSE combines all the requests of the M2M applications sent to the same target CSE, establishes the connection with the target CSE when the timer expires, and sends the combined requests to the target CSE after the connection is successfully established.

In the embodiment of the disclosure, the requests sent to the same target CSE are combined, and are simultaneously sent to the target CSE when the timer expires, so that network signalling and network resource consumption may be reduced.

Embodiment 2

Figure 3:
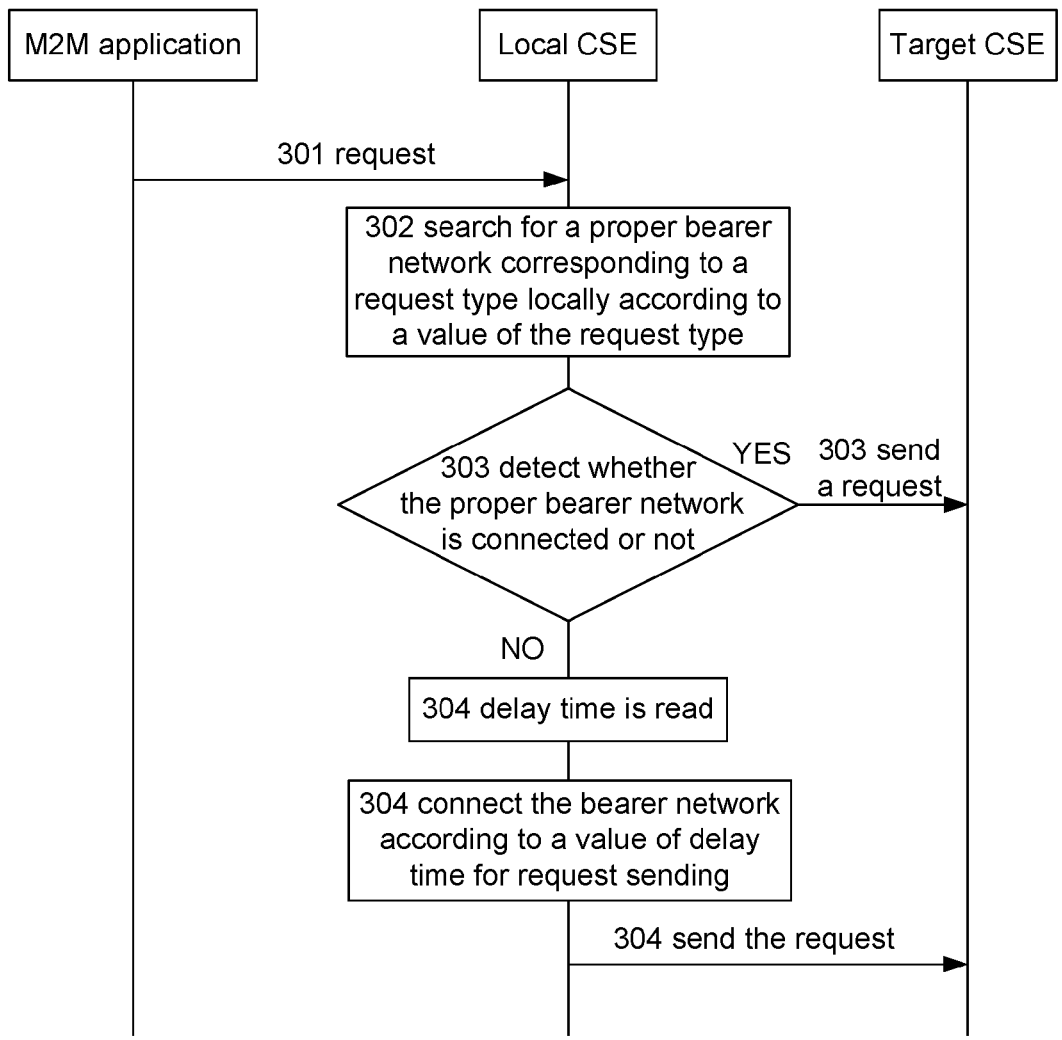
FIG. 3 is an implementation flowchart of a method for sending an M2M request according to embodiment 2 of the disclosure.

As shown in FIG. 3, an implementation flowchart of a method for sending an M2M request according to the embodiment includes the following steps:

Step 301: an M2M application sends a request to a local CSE to request the local CSE to send a request of the M2M application to a target CSE, the request including the following parameters: an application identifier, delay time for request sending, and a request type.

Preferably, before the step, the method further includes that: the CSE locally configures and stores a request type configuration table, each request type corresponding to one or more bearer network types in the request type configuration table.

Here, configuration operation of the request type configuration table is usually executed by a manager.

Step 302: after receiving the request, the local CSE reads a value of a request type in the request, and locally searches for a proper bearer network corresponding to the request type according to the value of the request type.

Here, the step that the local CSE locally searches for the proper bearer network corresponding to the request type according to the value of the request type is implemented as follows: the local CSE searches the locally stored request type configuration table for the proper bearer network corresponding to the request type according to the value of the request type in the request.

Here, the proper bearer network refers to: a bearer network selected according to a pre-configured strategy of the local CSE, for example: a bearer network type selected from the point of preset tariff of a certain application. For example, some applications are set to only use wired networks and Wireless Fidelity (WiFi) networks while some applications are set to use wired networks, WiFi networks and Third-Generation (3G) networks.

Step 303: the local CSE checks whether the found proper bearer network is connected to the target CSE or not, sends the request of the M2M application through the bearer network if the found proper bearer network is connected to the target CSE, otherwise Step 304 is executed.

Here, the step that the local CSE sends the request of the M2M application through the bearer network includes that:

If the local CSE determines that a certain proper bearer network has been connected to the target CSE, the local CSE immediately sends the request of the M2M application to the target CSE;

preferably, the local CSE further sends a feedback about the success of sending the request of the M2M application to the M2M application after successful sending; and if the local CSE determines that there are multiple proper bearer networks connected to the target CSE, the local CSE selects a front bearer network corresponding to the request type to send the request according to a sequence of a list of proper bearer networks, wherein the bearer network list is located in the request type configuration table.

Step 304: if no proper bearer network is detected to be connected to the target CSE, the local CSE reads a value of the delay time for request sending in the request, tries to connect the bearer network according to the value, and sends the request of the M2M application to the target CSE after successful connection.

Here, if the value of the delay time for request sending read by the local CSE is 0, the local CSE immediately establishes a connection with the target CSE according to the bearer network corresponding to the request type of the request, selects the front bearer network in the bearer network list to try to establish the connection at first, and sends the request of the M2M application to the target CSE after the connection is successfully established; if the connection with the target CSE is unsuccessfully established, the local CSE selects a subsequent bearer network (i.e. the bearer network ranked second) to try to establish the connection, and sends the request of the M2M application to the target CSE after the connection is successfully established, the local CSE sends a feedback about the request sending success to the M2M application after the request of the M2M application is successfully sent, and if all the bearer networks in the bearer network list are failed to try to establish connections, a message about a request sending failure is sent to the M2M application; and if the value of the delay time for request sending read by the local CSE is not 0, the local CSE starts a timer T, a value of T being not greater than the value of the delay time for request sending, the local CSE stores the request of the M2M application before the timer expires, tries to establish the connection with the target CSE when the timer expires, a connection establishment manner being the same as the above described, sends the request to the target CSE after the connection is successfully established, and sends the feedback about the request sending success to the M2M application, and if the connection with the target CSE is failed to be established, the local CSE feeds back the message about the request sending failure to the M2M application.

Preferably, the embodiment of the disclosure further includes that: if there is still a request of an M2M application sent to the same target CSE before the timer expires, the local CSE combines all the requests of the M2M applications sent to the same target CSE, establishes the connection with the target CSE when the timer expires, and sends the combined requests to the target CSE after the connection is successfully established.

After the request of the M2M application is successfully sent, the local CSE sends a feedback about the request sending success to the M2M application, and if the connection with the target CSE is failed to be established, a message about the request sending failure is fed back to the M2M application.

From the above, in the embodiment of the disclosure, when the bearer network fails or is disconnected, the request sent by the M2M application may not be invalidated immediately, but may still be reserved for a certain period of time on the local CSE, and when the bearer network is recovered or reconnected, the local CSE may send the request to the target CSE. In addition, in the embodiment of the disclosure, the requests sent to the same target CSE are combined, and are simultaneously sent to the target CSE when the timer expires, so that network signalling and network resource consumption may be reduced.

Embodiment 3

Figure 4:
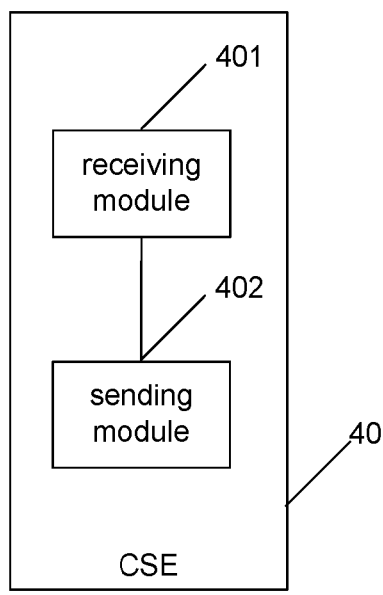
FIG. 4 is a structure diagram of a CSE according to an embodiment of the disclosure.

An embodiment of the disclosure further provides a CSE 40, and as shown in FIG. 4, the CSE 40 includes a receiving module 401 and a sending module 402, wherein the receiving module 401 is configured to receive a request from an M2M application; and the sending module 402 is configured to send the request of the M2M application to a target CSE according to a value of a request type in the request or according to a value of delay time for request sending and a value of a request type in the request, wherein the request sent by the M2M application includes one or more of the following parameters: an application identifier, the delay time for request sending, and the request type.

The sending module 402 may be implemented by a Central Processing Unit (CPU), a Digital Signal Processor (DSP) or a Field-Programmable Gate Array (FPGA) in the CSE 40.

Here, the operation that the sending module 402 sends the request of the M2M application to the target CSE according to the value of the request type in the request is implemented by:

searching a locally stored request type configuration table for a proper bearer network corresponding to the request type according to the value of the request type in the request, and sending the request of the M2M application to the target CSE through the proper bearer network when detecting that the proper bearer network has been connected to the target CSE.

Here, the operation that the sending module 402 sends the request of the M2M application to the target CSE according to the value of the delay time for request sending and the value of the request type in the request is implemented by:

searching the locally stored request type configuration table for a proper bearer network corresponding to the request type according to the value of the request type in the request, reading the value of the delay time for request sending in the request when detecting that the bearer network is not connected to the target CSE, trying to connect the bearer network according to the value of the delay time for request sending, and sending the request of the M2M application to the target CSE after successful connection.

Here, when the value of the delay time for request sending is 0, the operation that the sending module 402 tries to connect the bearer network according to the value of the delay time for request sending and sends the request of the M2M application to the target CSE after successful connection includes that:

the sending module 402 immediately establishes a connection with the target CSE according to the bearer network corresponding to the request type of the request of the M2M application, and sends the request of the M2M application to the target CSE after the connection is successfully established.

Here, when the value of the delay time for request sending is not 0, the operation that the sending module 402 tries to connect the bearer network according to the value of the delay time for request sending and sends the request of the M2M application to the target CSE after successful connection includes that:

the sending module 402 starts a timer in the CSE, a value of fixed time being not greater than the value of the delay time for request sending, stores the request of the M2M application before the fixed time is reached, tries to establish the connection with the target CSE when the timer expires, and sends the request of the M2M application to the target CSE after the connection is successfully established.

Preferably, the sending module 402 is further configured to, when determining that there is still a request of an M2M application sent to the same target CSE before the fixed time of the timer is reached, combine all the requests of the M2M applications sent to the same target CSE, establish the connection with the target CSE when the timer expires, and send the combined requests to the target CSE after the connection is successfully established.

The embodiment of the disclosure further provides a system for sending an M2M application request, which includes: an M2M application, a local CSE and a target CSE; and the local CSE is the abovementioned CSE.

Each module may be implemented by a CPU, a DSP or a FPGA in electronic equipment.

Those skilled in the art should know that the embodiments of the disclosure may be provided as a method, a system or a computer program product. Therefore, the disclosure may adopt a pure hardware embodiment, a pure software embodiment and a combined software and hardware embodiment. Moreover, the disclosure may adopt a computer program product implemented on one or more computer-available storage media (including, but not limited to, a disk memory, a Compact Disc Read-Only Memory (CD-ROM) and an optical memory) including computer-available program codes.

The disclosure is described with reference to flowcharts and/or block diagrams of the method, equipment (system) and computer program product according to the embodiments of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or other programmable data processing equipment, so that a series of operating steps are executed on the computer or other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above are only the preferred embodiments of the disclosure and not intended to limit the scope of protection of the disclosure.

INDUSTRIAL APPLICABILITY

According to the method, CSE and system for sending an M2M application request provided by the embodiments of the disclosure, a local CSE sends a request of an M2M application to a target CSE according to a value of a request type or according to a value of delay time for request sending and a value of a request type in the request after receiving the request sent by the M2M application, wherein the request sent by the M2M application includes one or more of the following parameters: an application identifier, the delay time for request sending and the request type. According to the embodiments of the disclosure, when a bearer network fails or is disconnected, the request sent by the M2M application may not be invalidated immediately, but may still be reserved for a certain period of time in the local CSE, and when the bearer network is recovered or reconnected, the local CSE may send the request to the target CSE. In addition, in the embodiments of the disclosure, the requests sent to the same target CSE are combined, and are simultaneously sent to the target CSE when the timer expires, so that network signalling may be reduced, and network resource consumption may be reduced.

What is claimed is:

1. A method for sending a request of a Machine-to-Machine (M2M) application, comprising:
receiving, by a local Common Service Entity (CSE), a request sent by an M2M application, wherein the request sent by the M2M application comprises: a delay time for request sending and a request type;
searching, by the local CSE, a locally stored request type configuration table for a bearer network corresponding to the request type according to a value of the request type in the request;
detecting, by the local CSE, whether the bearer network has been connected to a target CSE;
when detecting that the bearer network has been connected to the target CSE, sending, by the local CSE, the request of the M2M application to the target CSE through the bearer network; and
when detecting that the bearer network is not connected to the target CSE, reading, by the local CSE, a value of the delay time for request sending in the request, trying to connect the bearer network according to the value of the delay time for request sending, and sending, by the local CSE, the request of the M2M application to the target CSE after successful connection,
wherein the request type corresponds to one or more bearer network type(s) in the locally stored request type configuration table.

2. The method according to claim 1, wherein when the value of the delay time for request sending is 0, trying to connect the bearer network according to the value of the delay time for request sending and sending the request of the M2M application to the target CSE after successful connection comprises:
immediately establishing, by the local CSE, a connection with the target CSE according to the bearer network corresponding to the request type of the request of the M2M application, and sending the request of the M2M application to the target CSE after the connection is successfully established.

3. The method according to claim 1, wherein, when the value of the delay time for request sending is not 0, trying to connect the bearer network according to the value of the delay time for request sending and sending the request of the M2M application to the target CSE after successful connection comprises:
starting, by the local CSE, a timer, a value of fixed time being not greater than the value of the delay time for request sending;
storing, by the local CSE, the request of the M2M application before the fixed time is reached;
trying to establish the connection with the target CSE when the timer expires; and
sending the request of the M2M application to the target CSE after the connection is successfully established.

4. The method according to claim 3, further comprising:
if there is still a request of an M2M application sent to the same target CSE before the fixed time of the timer is reached, combining, by the local CSE, all the requests of the M2M applications sent to the same target CSE, establishing the connection with the target CSE when the timer expires, and sending the combined requests to the target CSE after the connection is successfully established.

5. A non-transitory computer storage medium, in which a computer-executable instruction is stored, the computer-executable instruction being configured to execute the method according to claim 1.

6. A Common Service Entity (CSE), comprising: a first processor and a first memory storing computer-readable instructions, wherein when the computer-readable instructions in the first memory are run, the first processor is configured to:
  receive a request sent by a Machine-to-Machine (M2M) application,
  wherein the request sent by the M2M application comprises: a delay time for request sending and a request type;
  search a locally stored request type configuration table for a bearer network corresponding to the request type according to a value of the request type in the request;
  detect whether the bearer network has been connected to a target CSE comprising a second processor and a second memory;
  when detecting that the bearer network has been connected to the target CSE, send the request of the M2M application to the target CSE through the bearer network; and
  when detecting that the bearer network is not connected to the target CSE, read a value of the delay time for request sending in the request, try to connect the bearer network according to the value of the delay time for request sending, and send the request of the M2M application to the target CSE after successful connection,
  wherein the request type corresponds to one or more bearer network type(s) in the locally stored request type configuration table.

7. The CSE according to claim 6, wherein the first processor is further configured to:
  when the value of the delay time for request sending is 0, immediately establish a connection with the target CSE according to the bearer network corresponding to the request type of the request of the M2M application, and send the request of the M2M application to the target CSE after the connection is successfully established.

8. The CSE according to claim 6, wherein the first processor is further configured to:
  when the value of the delay time for request sending is not 0, start a timer in the CSE, a value of fixed time being not greater than the value of the delay time for request sending, store the request of the M2M application before the fixed time is reached, try to establish the connection with the target CSE when the timer expires, and send the request of the M2M application to the target CSE after the connection is successfully established.

9. The CSE according to claim 8, wherein the first processor is further configured to:
  determine whether there is still a request of an M2M application sent to the same target CSE or not before the fixed time of the timer is reached, combine all the requests of the M2M applications sent to the same target CSE if there is still a request of an M2M application sent to the same target CSE, establish the connection with the target CSE when the timer expires, and send the combined requests to the target CSE after the connection is successfully established.

10. A system for sending a Machine-to-Machine (M2M) application request, comprising: an M2M application, a local Common Service Entity (CSE) and a target CSE, wherein the local CSE comprises a first processor and a first memory storing computer-readable instructions, wherein when the computer-readable instructions in the first memory are run, the first processor is configured to:
  receive a request sent by a Machine-to-Machine (M2M) application,
  wherein the request sent by the M2M application comprises: a delay time for request sending and a request type;
  search a locally stored request type configuration table for a bearer network corresponding to the request type according to a value of the request type in the request;
  detect whether the bearer network has been connected to a target CSE comprising a second processor and a second memory;
  when detecting that the bearer network has been connected to the target CSE, send the request of the M2M application to the target CSE through the bearer network; and
  when detecting that the bearer network is not connected to the target CSE, read a value of the delay time for request sending in the request, try to connect the bearer network according to the value of the delay time for request sending, and send the request of the M2M application to the target CSE after successful connection,
  wherein the request type corresponds to one or more bearer network type(s) in the locally stored request type configuration table.

11. The system according to claim 10, wherein the first processor is further configured to:
  when the value of the delay time for request sending is 0, immediately establish a connection with the target CSE according to the bearer network corresponding to the request type of the request of the M2M application, and send the request of the M2M application to the target CSE after the connection is successfully established.

12. The system according to claim 10, wherein the first processor is further configured to:
  when the value of the delay time for request sending is not 0, start a timer in the local CSE, a value of fixed time being not greater than the value of the delay time for request sending, store the request of the M2M application before the fixed time is reached, try to establish the connection with the target CSE when the timer expires, and send the request of the M2M application to the target CSE after the connection is successfully established.

13. The system according to claim 12, wherein the first processor is further configured to:
  determine whether there is still a request of an M2M application sent to the same target CSE or not before the fixed time of the timer is reached, combine all the requests of the M2M applications sent to the same target CSE if there is still a request of an M2M application sent to the same target CSE, establish the connection with the target CSE when the timer expires, and send the combined requests to the target CSE after the connection is successfully established.

* * * * *